US009534590B2

(12) United States Patent
Kataoka (10) Patent No.: US 9,534,590 B2
(45) Date of Patent: *Jan. 3, 2017

(54) COMPRESSOR

(71) Applicant: DAIKIN INDUSTRIES, LTD., Osaka-shi, Osaka (JP)

(72) Inventor: Yoshihiro Kataoka, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,428

(22) Filed: Jul. 8, 2014

(65) Prior Publication Data

US 2014/0322047 A1   Oct. 30, 2014

Related U.S. Application Data

(63) Continuation of application No. 13/262,480, filed as application No. PCT/JP2010/054695 on Mar. 18, 2010, now Pat. No. 8,816,561.

(30) Foreign Application Priority Data

Mar. 31, 2009   (JP) .................................. 2009-085015
Sep. 3, 2009   (JP) .................................. 2009-203972

(51) Int. Cl.
*H02K 3/34*   (2006.01)
*F04B 35/04*   (2006.01)
(Continued)

(52) U.S. Cl.
CPC ............. *F04B 35/04* (2013.01); *F04B 39/121* (2013.01); *H02K 3/325* (2013.01); *H02K 3/345* (2013.01); *H02K 15/02* (2013.01)

(58) Field of Classification Search
CPC .................................. H02K 3/345; H02K 3/48
(Continued)

(56) References Cited

U.S. PATENT DOCUMENTS 3,171,993 A   3/1965   Stevens et al.
4,160,926 A   7/1979   Cope et al.
(Continued)

FOREIGN PATENT DOCUMENTS

JP   59-63944 A   4/1984
JP   9-219949 A   8/1997
(Continued)

OTHER PUBLICATIONS

International Search Report for the corresponding international application No. PCT/JP2010/054695, issued on Apr. 27, 2010.
(Continued)

*Primary Examiner* — Hanh Nguyen
(74) *Attorney, Agent, or Firm* — Global IP Counselors (57) ABSTRACT

A compressor includes a casing and a motor disposed inside the casing. The motor is welded to the casing at a plurality of weld positions. The motor includes a core, a coil, at least one insulating member, recesses and a gap. The core has an annular back yoke portion, a plurality of tooth portions projecting radially inwardly from the back yoke portion and a slot formed between the tooth portions adjacent to each other. The coil is disposed in the slot. The insulating member is disposed in the slot to insulate the coil from the core. The recesses are formed in portions of the back yoke portion with each recess facing the slot. The gap is provided between the back yoke portion and the insulating member.

18 Claims, 10 Drawing Sheets

(51) Int. Cl.
   *F04B 39/12* (2006.01)
   *H02K 3/32* (2006.01)
   *H02K 15/02* (2006.01)

(58) Field of Classification Search
   USPC .................................................... 310/215
   See application file for complete search history.

(56) References Cited

U.S. PATENT DOCUMENTS

| | | | |
|---|---|---|---|
| 4,486,506 | A | 12/1984 | Kenjo et al. |
| 4,994,700 | A | 2/1991 | Bansal et al. |
| 2004/0219037 | A1 | 11/2004 | Higuchi et al. |
| 2009/0123308 | A1 | 5/2009 | Taniwa et al. |
| 2010/0021321 | A1 | 1/2010 | Koike et al. |
| 2010/0135830 | A1 | 6/2010 | Yasuda et al. |
| 2011/0018382 | A1* | 1/2011 | Ogawa et al. ................ 310/215 |

FOREIGN PATENT DOCUMENTS

| | | | |
|---|---|---|---|
| JP | 10-315398 | A | 12/1998 |
| JP | 2003-189523 | A | 7/2003 |
| JP | 2003-262192 | A | 9/2003 |
| JP | 2005-146937 | A | 6/2005 |
| JP | 2006-211828 | A | 8/2006 |
| JP | 2007-129878 | A | 5/2007 |
| JP | 2007-215364 | A | 8/2007 |
| JP | 2007-255332 | A | 10/2007 |
| JP | 2008-255808 | A | 10/2008 |
| JP | 2008-278673 | A | 11/2008 |
| JP | 2009-47062 | A | 3/2009 |

OTHER PUBLICATIONS

Notice of Reasons for Rejection for the corresponding Japanese application No. 2009-203972, issued on Apr. 20, 2010.

Decision of Final Rejection for the corresponding Japanese application No. 2009-203972, issued on Aug. 31, 2010.

International Preliminary Report of corresponding PCT Application No. PCT/JP2010/054695 dated Mar. 18, 2010.

* cited by examiner

COMPRESSOR

CROSS-REFERENCE TO RELATED APPLICATIONS

This application is a divisional application of U.S. patent application Ser. No. 13/262,480 filed on Sep. 30, 2011, which is a National Stage application of International Patent Application No. PCT/JP2010/054695 filed on Mar. 18, 2010. The entire disclosure of U.S. patent application Ser. No. 13/262,480 is hereby incorporated herein by reference.

TECHNICAL FIELD

The present invention relates to a compressor that joints a casing and a motor disposed inside the casing by welding at a plurality of weld positions.

BACKGROUND ART

In relation to a method of fixing a motor in a casing of a compressor, various compressors are suggested in which a casing and a motor disposed in the casing are joined by means of welding (e.g., see Japanese Unexamined Patent Publication Nos. 262192/2003 and 255332/2007).

SUMMARY

However, jointing a back yoke portion to a casing by welding may cause a problem that the welding heat is transferred to the back yoke portion thus melting an insulating member disposed in a slot. Such a problem is particularly noticeable in a motor with concentrated winding. This is because the thickness of the back yoke portion of such a motor is smaller than that of a motor with distributed winding. This enables the welding heat to be more easily transferred to the insulating member, thus causing the insulating member to be molten.

In view of the above problem, the present invention is made and it is an object of the present invention to provide a compressor in which melting of an insulating member disposed in a slot is restrained.

A first aspect of the present invention is a compressor including: a casing and a motor disposed inside the casing, which is jointed to the casing by welding at a plurality of weld positions, wherein the motor includes: a core having an annular back yoke portion, a plurality of tooth portions projecting radially inwardly from the back yoke portion, and a slot formed between the tooth portions adjacent to each other; a coil disposed in the slot; at least one insulating member disposed in the slot, which insulates the coil from the core; and a gap provided between the back yoke portion and the at least one insulating member.

In this compressor, the gap is provided between the back yoke portion and the insulating member. This restrains the welding heat from being transferred to the insulating member. As a result, the insulating member is restrained from being molten.

A second aspect of the present invention is the compressor of the first aspect of the present invention adapted so that a portion of the back yoke portion facing the slot is substantially in an arc-shape.

In the compressor, the portion of the back yoke portion facing the slot is formed in a substantially arc-shape. It is therefore unlikely that the insulating member is disposed along the surface of the back yoke portion, and a gap is easily formed between the back yoke portion and the insulating member. The higher the Young's modulus of the insulating member, the less likely to have the insulating member disposed along the back yoke portion.

A third aspect of the present invention is the compressor of the first or second aspect of the present invention adapted so that the at least one insulating member is made of an aramid-based resin.

In the compressor, the insulating member is made of an aramid-based resin whose Young's modulus is greater than PET which is a typically used material for the insulating member. This way, the insulating member is hardly warped. Thus, in the slot, the insulating member is not disposed along the back yoke portion, and the gap is formed between the back yoke portion and the insulating member. In other words, the gap fir restraining heat transfer to the insulating member is easily formed simply by changing the material for the insulating member, without a need of changing the shape of the core.

A fourth aspect of the present invention is the compressor of the first or second aspect of the present invention adapted so that: the at least one insulating member includes two or more insulating members which are laminated to each other; and one of the insulating members closest to the core is made of an aramid-based resin.

In the compressor, the reliability is improved by using, as a material for the insulating member closest to the core, an aramid-based resin which is excellent in the strength and the durability.

Further, by laminating a plurality of insulating members, the dielectric strength is improved.

Further, the insulating member closest to the core is made of an aramid-based resin whose Young's modulus is greater than PET which is a typically used material for the insulating member. This way, the insulating member is hardly warped. Thus, in the slot, a plurality of insulating members are not disposed along the back yoke portion, and the gap is formed between the back yoke portion and the insulating member. In other words, the gap for restraining heat transfer to the insulating member is easily formed simply by changing the material for the insulating member, without a need of changing the shape of the core.

A fifth aspect of the present invention is the compressor of the fourth aspect of the present invention adapted so that at least one of the insulating members disposed on an inner side of the insulating member made of an aramid-based resin is made of a polyethylene terephthalate film.

In a compressor adopting an insulating member made of an aramid-based resin, the insulating member is unlikely to be disposed along the shape of the slot, due to a high elasticity of the aramid-based resin. This may lead to a problem that the insulating member is enwound at the time of winding. In the above compressor however, a polyethylene terephthalate film which is highly flexible and which is easily disposed along the slot is disposed on the inner side of the insulating member made of the aramid-based resin. This polyethylene terephthalate film presses the insulating member on the outer side, which is made of the aramid-based resin. The insulating member made of the aramid-based resin is therefore firmly disposed. This restrains the insulating member from being enwound at the time of winding.

Further, this is more advantageous in terms of cost, as compared with a case of laminating insulating members made of an aramid-based resin, because the polyethylene terephthalate film is lower in costs than an insulating member made of an aramid-based resin.

A sixth aspect of the present invention is the compressor of any one of the first to fifth aspects of the present invention adapted so that recesses are formed in portions of the back yoke portion each facing the slot.

(1) With the provision of the recess to the compressor, the recess in the compressor absorbs distortion due to expansion and contraction stress caused by the welding heat. Thus, deformation of the core is reduced. This realizes an even air gap between the core and the rotor disposed in the core, thus restraining imbalance in the magnetic flux. As a result, an electromagnetic exciting force is restrained, and vibration and noise attributed by the vibration are restrained.

(2) Further, when the recess serves as a passage for an oil or refrigerant, the coil is cooled down. Therefore, the compressor achieves a better efficiency and a better reliability of the coil.

(3) Further, in the compressor, the electromagnetic vibration of the motor is absorbed by the recess. This restrains the vibration to be transmitted to the casing, thus keeping the noise and vibration low.

A seventh aspect of the present invention is the compressor of the sixth aspect of the present invention adapted so that each of the recesses is provided only in a portion corresponding to corresponding one of the weld positions, relative to the up/down direction.

The provision of the recess disturbs the flow of a magnetic flux. This compressor however minimizes such an influence by limiting the range in which the recess is provided.

An eighth aspect of the present invention is the compressor of the sixth or seventh aspect of the present invention adapted so that, in a plan view, each of the recesses extends in a direction crossing the radial direction, and is formed in such a manner that the recess is narrowed towards its both end portions relative to the direction crossing the radial direction, or that the both end portions have a circular shape.

The provision of the recess disturbs the flow of a magnetic flux. In the compressor however, the flow of the magnetic flux is smoothened and the influence of the recess is restrained by forming the recess in such a manner that the recess is narrowed towards its end portions or that the end portions of the recess have a circular shape.

A ninth aspect of the present invention is the compressor of any one of the sixth to eighth aspects of the present invention adapted so that: the casing has a weld hole which is provided to each of the weld positions; and in a plan view, the width of the recess relative to the direction crossing the radial direction is greater than the width of the weld hole relative to the direction crossing the radial direction.

In the compressor, the recess covers the range in which the welding-related heat radiates. Thus, a broad range of a portion of the insulating member which may be molten is covered by the recess.

A tenth aspect of the present invention is the compressor of any one of the sixth to ninth aspects of the present invention adapted so that each slot has more than one recesses.

In the compressor, the insulating member disposed in the slot is supported by a portion between the adjacent recesses, therefore it is possible to prevent the insulating member from being warped even with a provision of the recess.

An eleventh aspect of the present invention is the compressor of any one of the first to tenth aspects of the present invention adapted so that the winding method of the coil is a concentrated winding.

In a motor with a concentrated winding, the width of the back yoke portion relative to a radial direction is smaller than that of a motor with a distributed winding. Therefore, the problem that the insulating member may be molten is particularly noticeable in the motor of a concentrated winding. For this reason, the present invention restraining heat transfer to the insulating member is particularly effective for a compressor having a coil whose winding method is a concentrated winding.

A twelfth aspect of the present invention is the compressor of any one of the first to eleventh aspects of the present invention adapted so that a $CO_2$ refrigerant is used.

In a compressor adopting a $CO_2$ refrigerant, the motor and the casing are typically jointed to each other by welding at a plurality of weld positions. For this reason, the present invention restraining heat transfer to the insulating member is particularly effective for such a compressor adopting a $CO_2$ refrigerant.

The present invention described hereinabove brings about the following effects.

With the first aspect of the present invention, the gap is provided between the back yoke portion and the insulating member. This restrains the welding heat from being transferred to the insulating member. As a result, the insulating member is restrained from being molten.

With the second aspect of the present invention, the portion of the back yoke portion facing the slot is formed in a substantially arc-shape. It is therefore unlikely that the insulating member is disposed along the surface of the back yoke portion, and a gap is easily formed between the back yoke portion and the insulating member. The higher the Young's modulus of the insulating member, the less likely to have the insulating member disposed along the back yoke portion.

With the third aspect of the present invention, the insulating member is made of an aramid-based resin whose Young's modulus is greater than PET which is a typically used material for the insulating member. This way, the insulating member is hardly warped. Thus, in the slot, the insulating member is not disposed along the back yoke portion, and the gap is formed between the back yoke portion and the insulating member. In other words, the gap for restraining heat transfer to the insulating member is easily formed simply by changing the material for the insulating member, without a need of changing the shape of the core.

With the fourth aspect of the present invention, the reliability of the compressor is improved by using, as a material for the insulating member closest to the core, an aramid-based resin which is excellent in the strength and the durability.

Further, by laminating a plurality of insulating members, the dielectric strength is improved.

Further, the insulating member closest to the core is made of an aramid-based resin whose Young's modulus is greater than PET which is a typically used material for the insulating member. This way, the insulating member is hardly warped. Thus, in the slot, a plurality of insulating members are not disposed along the back yoke portion, and the gap is formed between the back yoke portion and the insulating member. In other words, the gap for restraining heat transfer to the insulating member is easily formed simply by changing the material for the insulating member, without a need of changing the shape of the core.

With the fifth aspect of the present invention, a polyethylene terephthalate film which is highly flexible and which is easy to dispose along the shape of the slot is disposed on the inner side of the insulating member made of the aramid-based resin. This polyethylene terephthalate film presses the insulating member on the outer side, which is made of the aramid-based resin. The insulating member made of the aramid-based resin is therefore firmly disposed. This restrains the insulating member from being enwound at the time of winding.

Further, this is more advantageous in terms of cost, as compared with a case of laminating insulating members made of an aramid-based resin, because the cost of the polyethylene terephthalate film is lower than that of an insulating member made of an aramid-based resin.

Further, (1) With the provision of the recess to the compressor of the sixth aspect of the present invention, the recess in the compressor absorbs distortion due to expansion and contraction stress caused by the welding heat. Thus, deformation of the core is reduced. This realizes an even air gap between the core and the rotor disposed in the core, thus restraining imbalance in the magnetic flux. As a result, an electromagnetic exciting force is restrained, and vibration and noise attributed to the vibration are restrained. (2) Further, when the recess serves as a passage for an oil or a refrigerant, the coil is cooled down. Therefore, the compressor achieves a better efficiency and a better reliability of the coil. (3) Further, in the compressor, the electromagnetic vibration of the motor is absorbed by the recess. This restrains the vibration to be transmitted to the casing, thus keeping the noise and vibration low.

With the seventh aspect of the present invention, disturbance to the flow of the magnetic flux is minimized by limiting the range in which the recess is provided.

Further, in the eighth aspect of the present invention, the recess is formed in such a manner that that the recess is narrowed toward its both end portions, or that the end portions of the recess are formed in a circular shape. This smoothen the flow of the magnetic flux, and disturbance to the flow of the magnetic flux is restrained.

Further, with the ninth aspect of the present invention, the recess covers the range in which the welding-related heat radiates. Thus, a broad range of a portion of the insulating member which may be molten is covered by the recess.

Further, in the tenth aspect of the present invention, the insulating member disposed in the slot is supported by a portion between the adjacent recesses, therefore it is possible to prevent the insulating member from being warped even with a provision of the recess.

In a motor of a concentrated winding which is related to the eleventh aspect of the present invention, the width of the back yoke portion in a radial direction is small. Therefore, the problem that the insulating member may be molten is particularly remarkable in the motor of a concentrated winding. For this reason, the present invention restraining heat transfer the insulating member is particularly effective for a compressor having a coil whose winding method is a concentrated winding.

In a compressor of which adopts a $CO_2$ refrigerant such as the one relating to the twelfth aspect of the present invention, the motor and the casing are typically jointed to each other by welding at a plurality of weld positions. For this reason, the present invention restraining heat transfer to the insulating member is particularly effective for such a compressor adopting a $CO_2$ refrigerant.

DETAILED DESCRIPTION OF EMBODIMENTS

The following describes with reference to the attached drawings embodiments of a rotary compressor for a $CO_2$ refrigerant, according to the present invention.

First Embodiment

Figure 1:
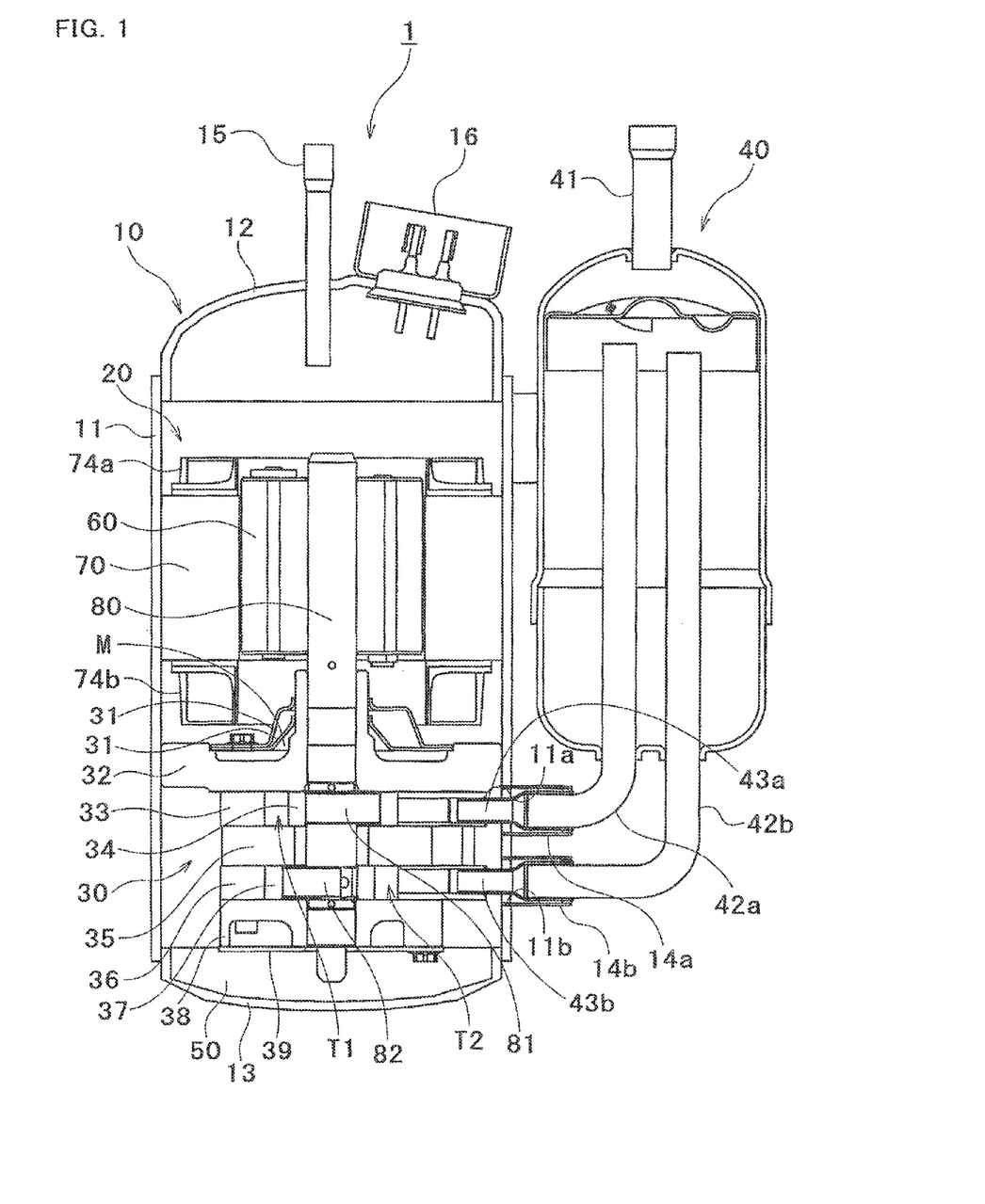
FIG. 1 is a cross sectional view showing an internal structure of a rotary compressor for a $CO_2$ refrigerant, in relation to a first embodiment of the present invention.
Figure 2:
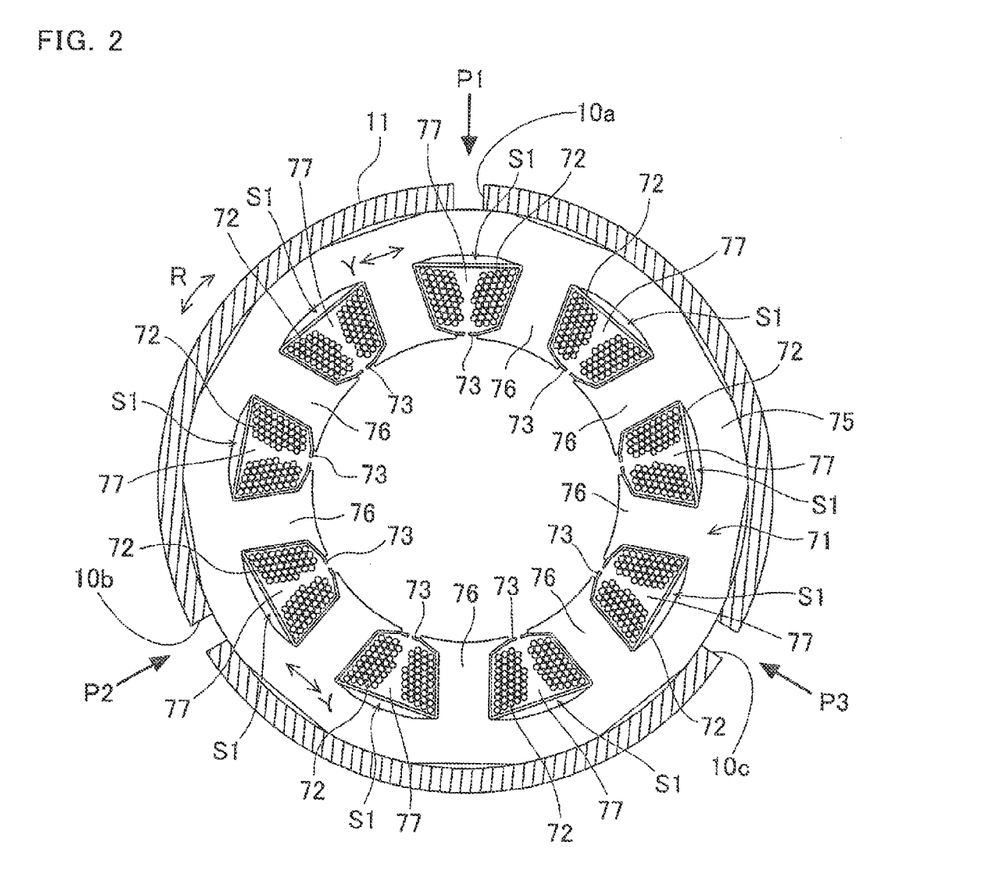
FIG. 2 is a horizontal cross sectional view of the compressor.
Figure 3:
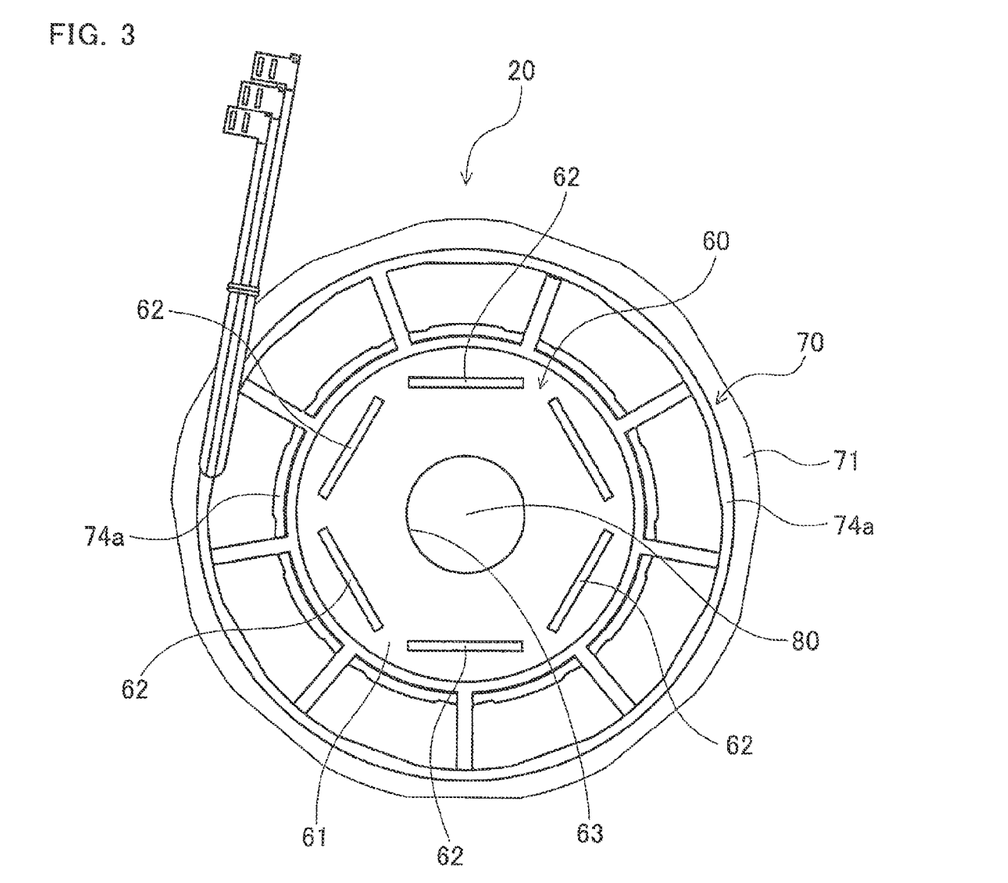
FIG. 3 is a plan view of the motor.
Figure 4:
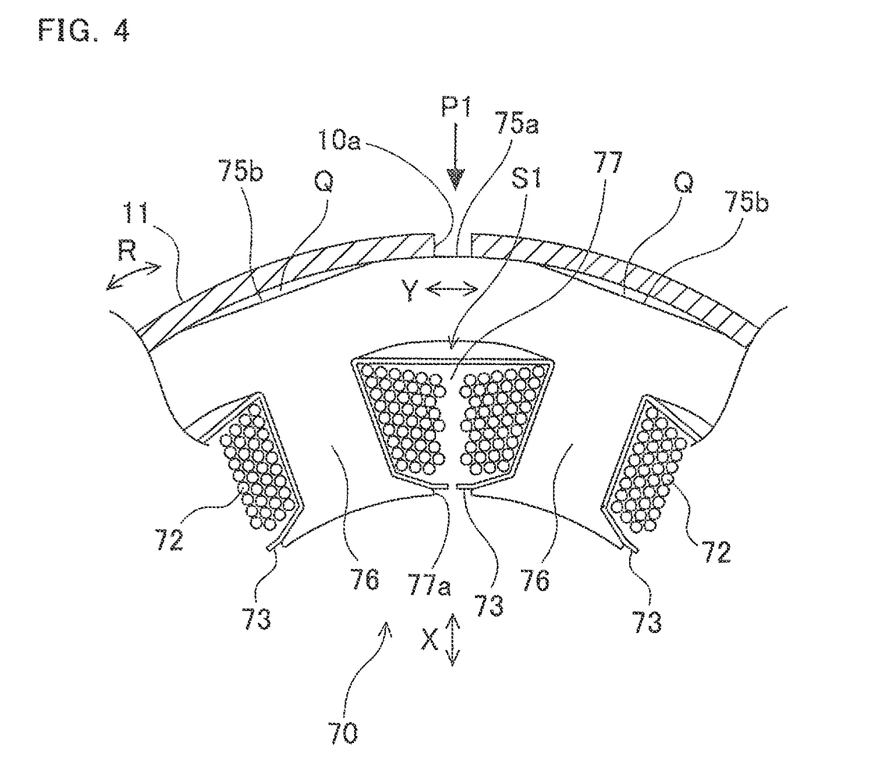
FIG. 4 is an partially enlarged view of a stator.
Figure 5:
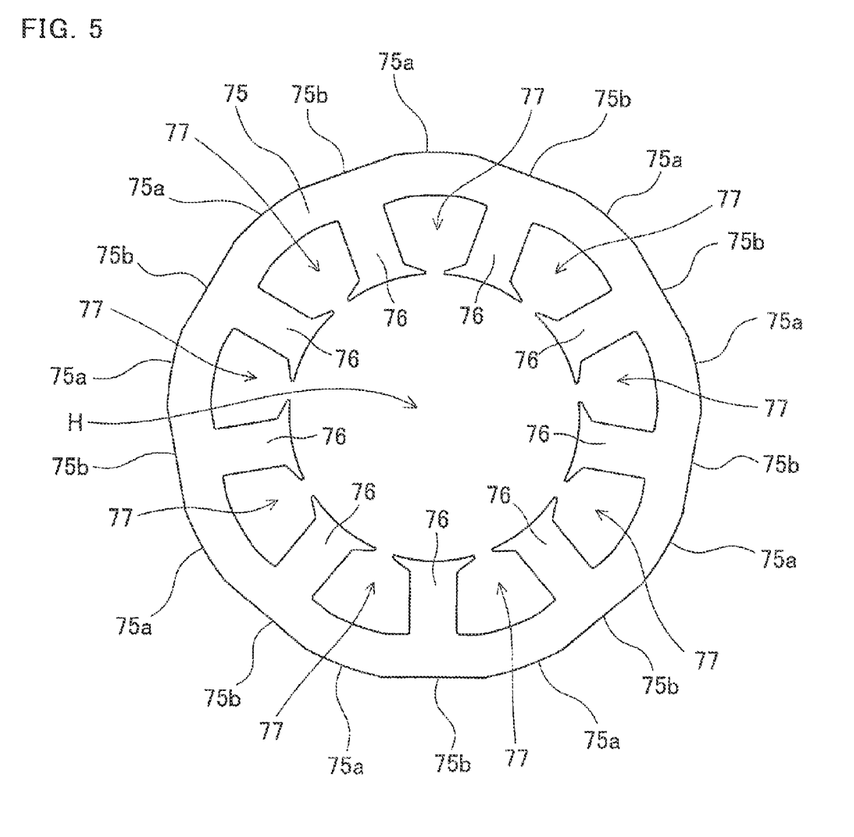
FIG. 5 is a plan view of a core.

FIG. 1 is a cross sectional view showing an internal structure of a rotary compressor for a $CO_2$ refrigerant, which relates to a first embodiment of the present invention. FIG. 2 is a horizontal cross sectional view of the compressor. FIG. 3 is a plan view of the motor. FIG. 4 is an partially enlarged view of a stator. FIG. 5 is a plan view of a core. With reference to FIG. 1 to FIG. 5, the following describes a compressor 1 related to the first embodiment of the present invention.

Overall Structure of Rotary Compressor

As shown in FIG. 1, a rotary compressor 1 of the first embodiment is a 2 cylinder rotary compressor and includes: a sealed casing 10; a motor 20 and a compression mechanism 3 disposed inside the sealed casing 10; and an accumulator 40 disposed on a side of the sealed casing 10. This rotary compressor 1 is a compressor of a high-pressure dome type, and uses a $CO_2$ refrigerant (hereinafter, simply referred to as refrigerant). In the rotary compressor 1, the compression mechanism 30 is disposed under the motor 20 within the sealed casing 10. Further, in an under part of the sealed casing 10 is stored lubricating oil 50 to be supplied to each slide portion of the compression mechanism 30.

Sealed Casing

The sealed casing 10 is structured by a pipe 11, a top 12, and a bottom 13. The pipe 11 is a substantially cylindrical member extended in up/down directions, whose upper and lower ends are opened. Further, on a side face of the pipe 11 are formed two connection ports 11a and 11b through which later-mentioned inlet tubes 43a and 43b are introduced to the inside of the sealed casing 10. These connection ports 11a and 11b are aligned in the up/down directions. The inner circumferences of the connection ports 11a and 11b are connected to cylindrical joint tubes 14a and 14b which hold the inlet tubes 43a and 43b, respectively. The top 12 is a member for closing an opening at the upper end of the pipe 11. To the top 12 is attached a discharge pipe 15 which ejects a high-temperature and high-pressure refrigerant compressed by the compression mechanism 30 to the outside of the sealed casing 10. Further, the top 12 is provided with a terminal 16 to be connected to the motor 20. The bottom 13 is a member for closing an opening at the lower end of the pipe 11. The sealed casing 10 structured as described with the pipe 11, the top 12 and the bottom 13 forms a sealed space.

In the present embodiment, the motor 20 is disposed inside the pipe 11, and the pipe 11 and the motor 20 are spot welded to each other at three weld positions P1 to P3, as shown in FIG. 2. In portions of the pipe 11 corresponding to the three weld positions P1 to P3, the weld holes 10a to 10c are provided respectively. These weld positions P1 to P3 and the weld holes 10a to 10c are provided at intervals of 120 degrees along the circumference (in R directions). In an compressor 1 using a $CO_2$ refrigerant, the pipe 11 and the motor 20 are typically fixed to each other by welding.

Motor

The motor 20 is a motor whose winding method is a concentrated winding, in which coils 72 of phases (U phase, V phase, W phase) are formed at the tooth portion 76 of the core 71. This motor 20 is provided to drive the compression mechanism 30 disposed below, and includes a rotor 60 and a stator 70 disposed radially outward of the rotor 60 with an air gap between the stator 70 and the rotor 60, as shown in FIG. 3.

Rotor

The rotor 60 has a core 61 and a plurality of permanent magnets 62. The core 61 is formed by laminating a plurality of thin metal plates and welding these plates to one another. Further, the core 61 has, at substantially its center, a through hole 63 having substantially a circular shape in a plan view. Into this through hole 63 is inserted an upper end portion of a shaft 80. This shaft 80 is fixed to the core 61.

Stator

As shown in FIG. 2 and FIG. 3, the stator 70 has a core 71, a coil 72, a slot cell (insulating member) 73, and insulators 74a and 74b (see FIG. 1).

Core

The core 71 is formed by laminating a plurality of thin metal plates and welding these plates to one another. As shown in FIG. 4 and FIG. 5, the core 71 has an annular back yoke portion 75; nine tooth portions 76 which project inwardly in a radial direction (X-direction) from the back yoke portion 75, and nine slots 77 formed between tooth portions 76. The core 71 has, at substantially its center portion, a through hole H extended in the up/down directions, Inside this through hole H is disposed a rotor 60 (see FIG. 3). Note that, in the motor 20 with the coil 72 adopting a concentrated winding as its winding method, the width of a back yoke portion 75 in a radial direction (X-direction) is smaller than that of a motor whose coil adopts a distributed winding as its winding method.

On the outer circumference of the back yoke portion 75, there are arc portions 75a each contacting the inner circumference of the pipe 11, and core cut portions 75b not contacting the inner circumference of the pipe 11. The arc portions 75a and the core cut portions 75b are alternately disposed along the circumference (in the R directions). Each arc portion 75a is curved so as to be disposed along the inner circumference of the pipe 11, while each core cut portion 75b is formed to have a flat surface. In the present embodiment, the slot 77 is provided on the inner side of the arc portion 75a in the radial direction (X-direction), while the tooth portion 76 is formed on the inner side of the core cut portion 75b in the radial direction (X-direction). Further, the weld positions P1 to P3 are provided to the arc portions 75a which contact the inner circumference of the pipe 11. On the other hand, between the core cut portion 75b and the inner circumference of the pipe 11, a gap Q (see FIG. 4) is formed. Portions of the inner circumference of the back yoke portion 75 each facing the slot 77 are formed in an arc-shape.

As shown in FIG. 2, coils 72 of phases (U phase, V phase, W phase) are wound at the nine tooth portions 76. Specifically, coils 72 of the U phase, the V phase, and the W phase are wound in this order at the tooth portions 76 along the circumference the R direction).

The nine slots 77 penetrate the cores 71 in the up/down directions (Z direction), Respectively. Further, each of the nine slots 77 are in communication with the through hole 11 via an opening 77a (see FIG. 4) formed between the tooth portions 76 adjacent to each other. Through this opening 77a, a nozzle (not shown) of a winding machine is inserted into the slot 77 to wind the coil 72 around the tooth portion 76.

Here, in the present embodiment, a slot cell 73 (0.1 mm to 0.5 mm in thickness) for insulating the tooth portion 76 and the coil 72 is inserted in the slot 77, as shown in FIG. 4. The slot cell 73 is made of an aramid-based resin whose Young's modulus is greater than PET (polyethylene terephthalate) which is more typically used as the material for the slot cell. Therefore, a portion of the slot cell 73 facing the inner circumference of the back yoke portion 75 extends straight in a direction (Y-direction) perpendicularly crossing the radial direction (X-direction), instead of being formed in an arc-shape that is disposed along the inner circumference of the back yoke portion 75. This way, a gap S1 is formed between the inner circumference of the back yoke portion 75 and the portion of the slot cell 73 facing the inner circumference. This gap S1 is reduced towards its both end portions relative to the direction (Y-direction) perpendicularly crossing the radial direction (X-direction). Thus, the slot cell 73 does not contact the back yoke portion 75 while contacting the tooth portion 76.

Note that the "aramid-based" means a polyamide fiber in the aromatic series.

Shaft

As shown in FIG. 1, the shaft 80 rotates along with the rotor 60 thus rotating the pistons 34 and 37 of the compression mechanism 30. This shaft 80 has an eccentric portion 81 which is positioned in a cylinder chamber T1 of a later-mentioned front cylinder 33, and an eccentric portion 82 which is positioned in a cylinder chamber T2 of a rear cylinder 36. To these eccentric portions 81 and 82 are mounted pistons 34 and 37, respectively, With the rotation of the shaft 80, the piston 34 mounted to the eccentric portion 81 rotates in the cylinder chamber T1, and the piston 37 mounted to the eccentric portion 82 rotates in the cylinder chamber T2. Note that the respective positions of the eccentric portion 81 and the eccentric portion 82 are displaced by 180° in the rotation direction of the shaft 80.

Compression Mechanism

As shown in FIG. 1, the compression mechanism 30 has a front muffler 31 having a double structure, a front head 32, the front cylinder 33 and the piston 34, a middle plate 35, a rear cylinder 36 and the piston 37, a rear head 38, a rear muffler 39, sequentially in this order from top to the bottom along the rotational axis of the shaft 80 of the motor 20.

The front muffler 31 ejects to a primary space the refrigerant ejected from an ejection port (not shown) provided to the front head 32, while reducing the noise. This front muffler 31 is attached to the front head 32.

The front head 32 is jointed to an upper surface of the front cylinder 33, and closes an opening at the upper end of the cylinder chamber T1. The front head 32 is provided with an ejection port (not shown) from which the refrigerant compressed in the cylinder chamber T1 is ejected to a muffler space M formed by the front muffler 31.

The front cylinder 33 is provided with the cylinder chamber T1 at its center portion. In the cylinder chamber T1 is disposed the piston 34 which rotates eccentrically with rotation of the shaft 80. This cylinder chamber T1 is in communication with the muffler space M via the above-mentioned ejection port. Thus, the refrigerant compressed by eccentric rotation of the piston 34 mounted to the eccentric portion 81 of the shaft 80 is guided from the cylinder chamber T1 to the muffler space M.

The piston 34 rotates eccentrically along the inner circumference of the cylinder chamber T1 thus compressing the refrigerant sucked in from the accumulator 40.

The middle plate 35 is disposed between the front cylinder 33 and the rear cylinder 36. This middle plate 35 closes the opening at the lower part of the cylinder chamber T1 in the front cylinder 33 as well as the opening at the upper portion of the cylinder chamber T2 of the rear cylinder 36.

Descriptions regarding the rear cylinder 36, the piston 37, the rear head 38, and the rear muffler 39 are omitted as these members functions similarly to those of the front cylinder 33, the piston 34, the front head 32, and the front muffler 31, respectively. Note that the refrigerant compressed in the cylinder chamber T2 of the rear cylinder 36 is guided to the muffler space M via a communication hole (not shown) which is in communication with the rear head 38, the rear cylinder 36, the middle plate 35, and the front cylinder 33, and an introduction port (not shown) formed on the front head 32, after the refrigerant passes a muffler space (not shown) formed by the rear head 38 and the rear muffler 39.

Accumulator

The accumulator 40 is provided for supplying a refrigerant from the outside of the sealed casing 10 into the cylinder chamber T1 of the front cylinder 33 and the cylinder chamber T2 of the rear cylinder 36. As shown in FIG. 1, the accumulator 40 has an entrance tube 41 extended in a vertical direction, and two exit tubes 42a and 42b which are bent substantially in an L-shape. This way, the refrigerant flowing in from the entrance tube 41 is supplied to the cylinder chambers T1 and T2, through exit tubes 42a and 42b.

To the leading ends of the exit tubes 42a and the 42b are connected substantially cylindrical inlet tubes 43a and 43b, respectively. These inlet tubes 43a and 43b are connected to the cylinders 33 and 36 via the joint tubes 14a and 14b jointed to the sealed casing 10, respectively.

Characteristics of the Compressor of the Present Embodiment

The compressor 1 of the present embodiment has the following characteristics.

In the compressor 1 of the present embodiment, the gap S1 is provided between the back yoke portion 75 and the slot cell 73. This restrains the welding heat from transferring to the slot cell 73. As a result, the slot cell 73 is kept from being molten.

Further, in the compressor 1 of the present embodiment, the slot cell 73 is made of an aramid-based resin whose Young's modulus is greater than PET which is a typically-adopted material. The slot cell 73 therefore is less likely to be warped. Thus, the slot cell 73 is not disposed along the back yoke portion 75 in the slot 77, and the gap S1 is formed between the back yoke portion 75 and the slot cell 73. In other words, the gap S1 for restraining heat transfer to the slot cell 73 is easily formed simply by changing the material for the slot cell 73, without a need of changing the shape of the core 71.

Further, in the compressor 1 of the present embodiment, the portion of the back yoke portion 75 facing the slot 77 is formed in a substantially arc-shape. It is therefore very unlikely that the slot cell 73 is disposed along the surface of the back yoke portion 75, and the gap S1 is easily formed between the back yoke portion 75 and the slot cell 73. In particular, the higher the Young's modulus of the slot cell 73, the less likely to have the slot cell 73 disposed along the back yoke portion 75.

In a compressor with a coil adopting a concentrated winding as its winding method, the width of the back yoke portion 75 relative to the radial direction (X-direction) is smaller than that of the motor with a distributed winding. For this reason, the problem of melting the slot cell 73 particularly takes place in such a coil adopting the concentrated winding. The compressor 1 aimed at restraining the heat transfer to the slot cell 73 therefore is particularly advantageous.

Further, in a compressor adopting a $CO_2$ refrigerant, the casing and the motor are typically jointed to each other by welding. The compressor 1 aimed at restraining the heat transfer to the slot cell 73 therefore is particularly advantageous.

Second Embodiment

Figure 6:
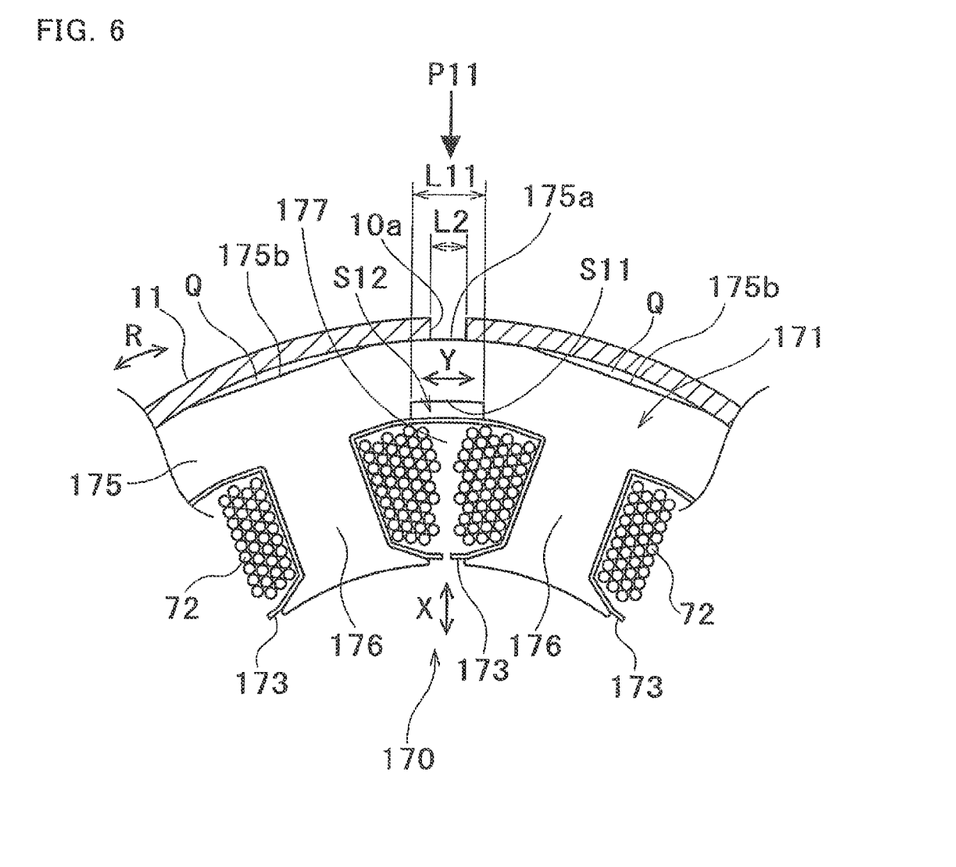
FIG. 6 is a partially enlarged view of a stator, in relation to a second embodiment of the present invention.
Figure 7:
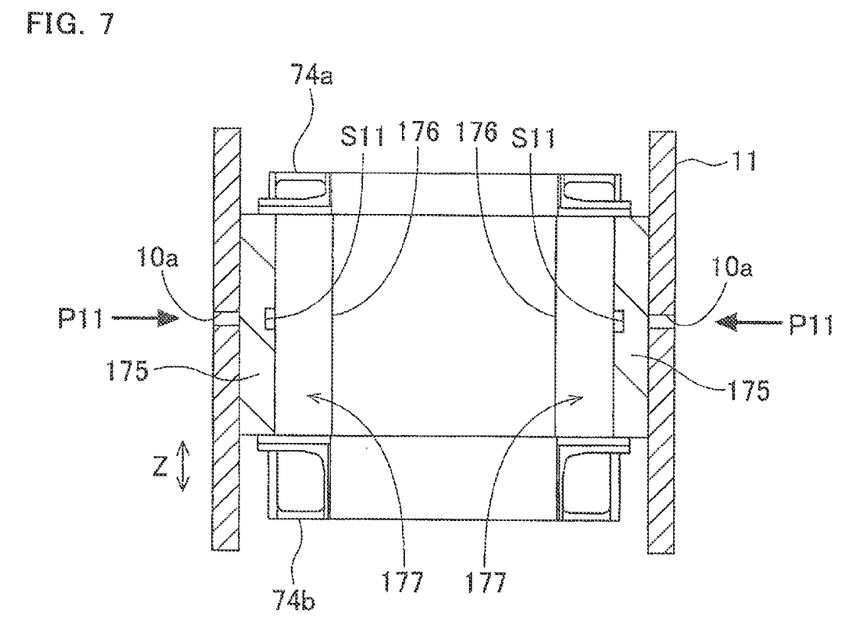
FIG. 7 is a schematic cross sectional view of a motor and a pipe which indicates positional relation between a weld position and a recess.

FIG. 6 is a partially enlarged view of a stator, in relation to a second embodiment of the present invention. FIG. 7 is a schematic cross sectional view of a motor and a pipe which indicates positional relation between a weld position and a recess. The following describe a compressor related to the second embodiment of the present invention, with reference to FIG. 6 and FIG. 7. In the first embodiment, the gap is formed between the back yoke portion 75 and the slot cell 73, by adopting an aramid-based material for the slot cell 73. The second embodiment deals with a case where a gap is formed between the slot cell 173 and the back yoke portion 175, by forming a recess S11 on a portion of the back yoke portion 175 facing the slot 177. The second embodiment is the same as the first embodiment except in the structure of the stator 170. Therefore, the descriptions are omitted as needed.

Core

The core 171 is formed by laminating a plurality of thin metal plates and welding these plates to one another. As shown in FIG. 6, the core 171 has an annular back yoke portion 175, a plurality of tooth portions 176 each projecting inwardly from the back yoke portion 175 in a radial direction (X-direction), and a slot 177 formed between tooth portions 176 adjacent to each other.

On the outer circumference of the back yoke portion 175, there are arc portions 175a each contacting the inner circumference of the pipe 11, and core cut portions 175b not contacting the inner circumference of the pipe 11. The arc portions 175a and the core cut portions 175b are alternately disposed along the circumference (in the R direction). In the present embodiment, the slot 177 is provided on the inner side of the arc portion 175a relative to the radial direction (X-direction), and the tooth portions 176 is provided on the inner side of the core cut portion 175b relative to the radial direction (X-direction). Further, the weld position P11 is provided to the arc portion 175a which contacts the inner circumference of the pipe 11. On the other hand, between the core cut portion 175b and the inner circumference of the pipe 11, a gap Q is formed.

In the present embodiment, the back yoke portion 175 has a recess S11 at its portion which corresponds to the weld position P11 and which faces the slot 177. This recess S11 is provided between the weld position P11 and the slot 177 nearby the weld position P11. In a plan view, the recess S11 extends in a direction (Y-direction) perpendicularly crossing the radial direction (X-direction). The length L11 (Y-direction) of the recess S11 is greater than the width L2 of the weld hole 10a relative to the Y-direction.

Further, in the present embodiment, the above described recess S11 is provided only in a portion corresponding to the weld position P11 relative to the up/down direction (Z-direction), as shown in FIG. 7. In other words, the recess S11 is provided to the same height as that of the weld position P11.

In the slot 177 is inserted a slot cell 173 for insulating the tooth portions 176 and the coil 172. Unlike the slot cell 73 of the first embodiment made of the aramid-based resin, the slot cell 173 (0.1 mm to 0.5 mm in thickness) is made of PET whose Young's modulus is smaller than that of the aramid-based resin. Although a portion of the slot cell 173 facing the inner circumference of the back yoke portion 175 contacts the inner circumference of the back yoke portion 175 in the present embodiment, the recess S11 is formed on the inner circumference of the back yoke portion 175. This forms the gap S12 between the inner circumference of the back yoke portion 175 and the inner circumference of the slot cell 173.

Characteristics of the Compressor of the Present Embodiment

The compressor of the present embodiment has the following characteristics.

With the provision of the recess S11, the gap S12 in the compressor of the present embodiment absorbs distortion due to expansion and contraction stress caused by the welding heat. Thus, deformation of the core 171 is reduced. This realizes an even air gap between the core 171 and the rotor (see FIG. 3) disposed in the core 171, thus restraining imbalance in the magnetic flux. As a result, an electromagnetic exciting force is restrained, and vibration and noise attributed to the vibration are restrained.

Further, when the recess S11 serves as a passage for an oil or a refrigerant, the coil 172 is cooled down. Therefore, the compressor of the present embodiment achieves a better efficiency and a better reliability of the coil 172.

Further, in the compressor of the present embodiment, the electromagnetic vibration of the motor is absorbed by the gap S12. This restrains the vibration to be transmitted to the pipe 11, thus keeping the noise and vibration low.

Further, in the compressor of the present embodiment, the recess S11 is provided to only a portion corresponding to the weld position P11 relative to the up/down direction (Z-direction). Limiting the range in which the recess S11 is provided minimizes a negative influence of the recess S11 to the flow of the magnetic flux.

Further, in the compressor of the present embodiment, the length L11 of the recess S11 relative to the direction (Y-direction) which perpendicularly crosses the radial direction (X-direction) is greater than the length L2 of the weld hole 10a in the same direction, in a plan view. This way the recess S11 covers the range in which the welding-related heat radiates. Thus, the recess S11 covers a broad range of a portion of the slot cell 73 which may be molten.

Variation

Figure 8:
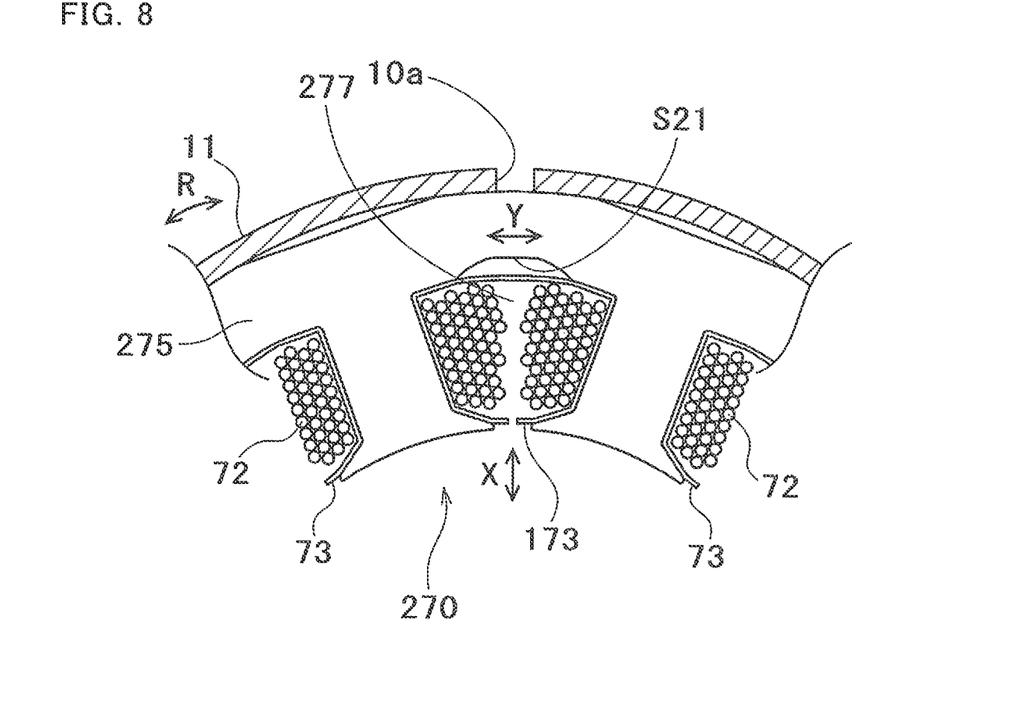
FIG. 8 is a partially enlarged view of a stator, in relation to a first variation of the second embodiment of the present invention.
Figure 9:
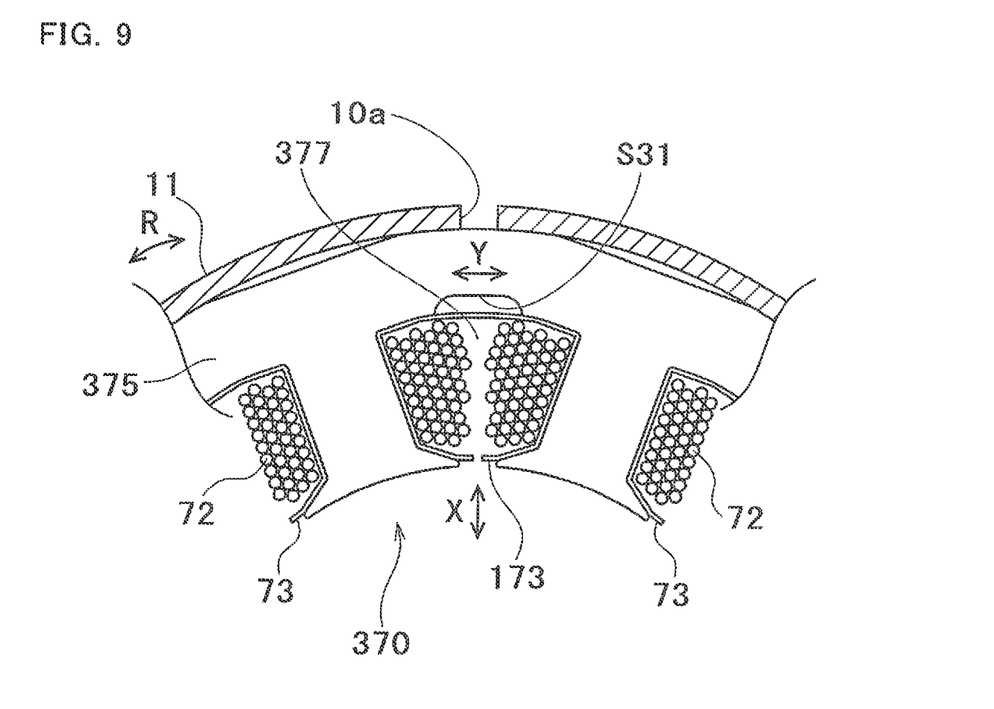
FIG. 9 is a partially enlarged view of a stator, in relation to a second variation of the second embodiment of the present invention.
Figure 10:
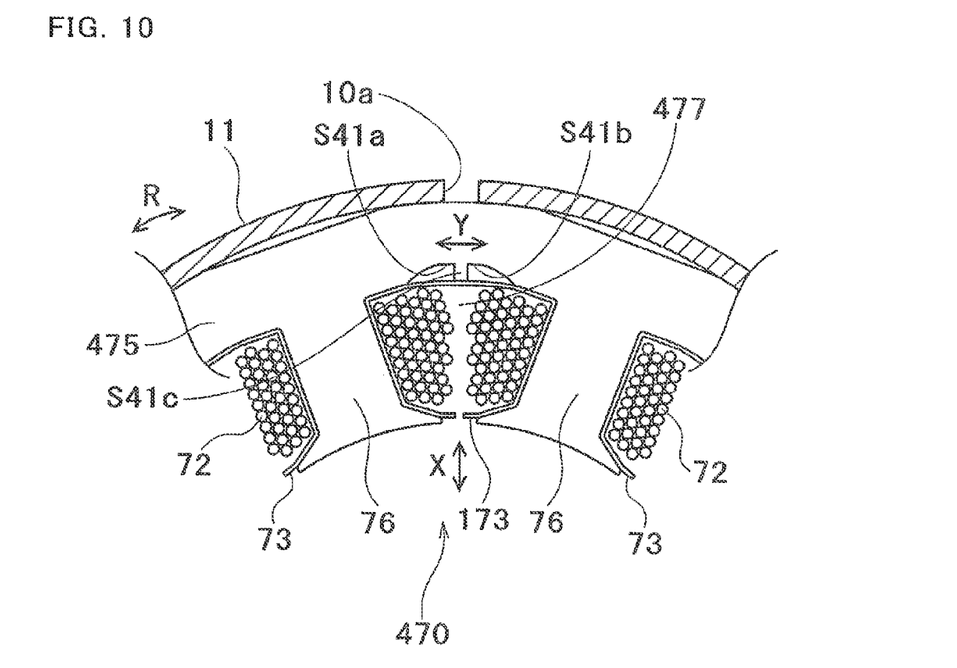
FIG. 10 is a partially enlarged view of a stator, in relation to a third variation of the second embodiment of the present invention.

FIG. 8 is a partially enlarged view of a stator which relates to a first variation of the second embodiment of the present invention. FIG. 9 is a partially enlarged view of a stator which relaters to a second variation of the second embodiment of the present invention. FIG. 10 is a partially enlarged view of a stator which relates to a third variation of the second embodiment of the present invention. The above described second embodiment deals with a case where a substantially rectangular recess S11 is provided to the back yoke portion 175. The present invention however is not limited to such a case.

Specifically, as a stator 270 of a first variation shown in FIG. 8, the recess S21 to be formed in a portion of the back yoke portion 275 facing the slot 277 may be formed so that the recess S21 is narrowed towards the both end portions relative to the Y-direction. Further, as a stator 370 of a second variation shown in FIG. 9, the recess S31 to be formed in a portion of the back yoke portion 375 facing the slot 377 may be formed so that the both end portions of the recess S31 relative to the Y-direction have substantially a circular shape. Provision of the recess S21 or S31 disturbs the flow of the magnetic flux; however, the flow of the magnetic flux is smoothened and the influence of the recess S21 or S31 is restrained by narrowing down the recess S21 or S31 towards its both end portions relative to the Y-direction, or by forming the recess S21 or S31 to have a circular shape at its end portions on the both sides relative to the Y-direction.

Further, as a stator 470 of a third variation of the second embodiment shown in FIG. 10, two recesses S41a and S41b may be provided for a single slot 477. In this case, by disposing the recesses S41a and S41b apart from each other by a predetermined distance in the Y-direction, a protrusion S41c is formed between the recesses S41a and S41b. This protrusion S41c supports the slot cell 73 disposed in the slot 477 thereby preventing the slot cell 73 from being warped. As the result, the slot cell 73 is prevented from being warped while being disposed, even when the recesses S41a and S41b are provided in the portion of the back yoke portion 475 facing the slot 477. This third variation is particularly advantageous in cases where the slot cell 73 is made of PET or the like whose Young's modulus is smaller than the aramid-based resin, because the slot cell 73 made of such a material is easily warped.

Third Embodiment

Figure 11:
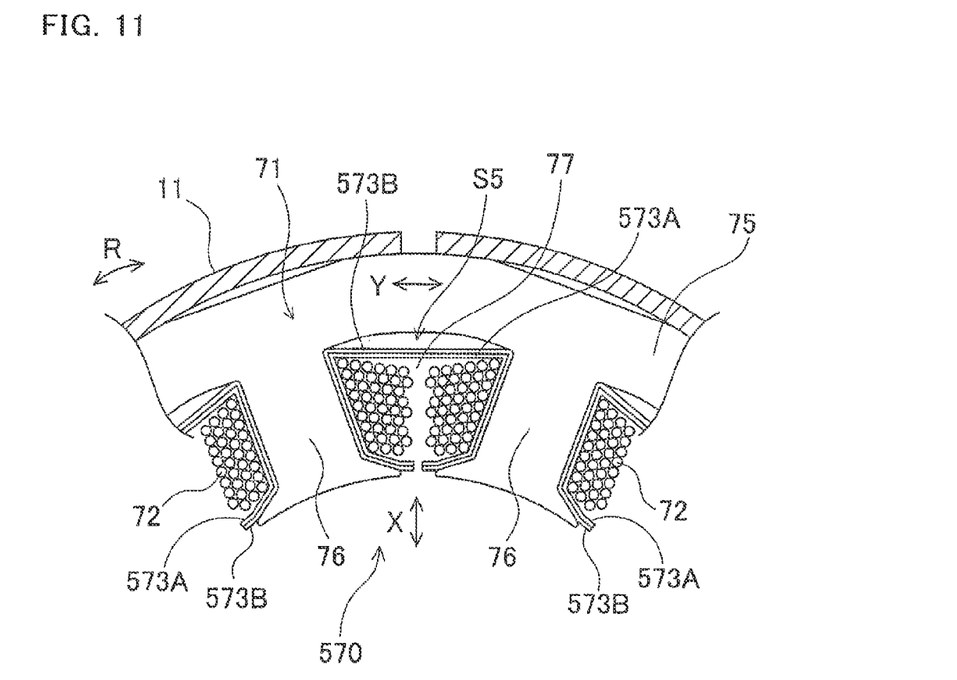
FIG. 11 is a partially enlarged view of a stator, in relation to a third embodiment of the present invention.

Next, with reference to FIG. 11, the following details a compressor related to a third embodiment of the present invention. Note that the first and the second embodiments deal with a case where a single slot cell (insulating member) insulates the coil from the core. The third embodiment however deals with a case of using two slot cells to insulate the coil from the core. The third embodiment is the same as the first embodiment except for the structure of a stator 570. Therefore, the descriptions are omitted as needed.

Core

The core 71 is the same as that of the first embodiment, and is formed by laminating a plurality of thin metal plates and welding these plates to one another. As shown in FIG. 11, the core 71 has an annular back yoke portion 75, a plurality of tooth portions 76 each projecting inwardly from the back yoke portion 75 in a radial direction (X-direction), and a slot 77 formed between tooth portions 76 adjacent to each other.

Here, in the present embodiment, the slot 77 has therein two slot cells 573A and 573B for insulating the core 71 from the coil 72. These slot cells 573A and 573B are laminated to each other. In the present embodiment, the slot cell 573A (0.1 mm to 0.5 mm in thickness) on the side of the coil 72 (hereinafter, inner side) is made of a PET film, whereas the slot cell 573B (0.1 mm to 0.5 mm in thickness) on the side of the core 71 (hereinafter, outer side) is made of an aramid-based nonwoven fabric.

Note that the "aramid-based" means a polyamide fiber in the aromatic series.

That is, the slot cell 573B made of an aramid-based nonwoven fabric whose Young's modulus is greater than the slot cell 573A on the inner side and which excels in the strength and durability is disposed on the outer side. Since the slot cell 573B with a greater Young's modulus is disposed on the outer side, the portion of the slot cell 573B facing the inner circumference of the back yoke portion 75 extends straight along the direction (Y-direction) perpendicularly crossing the radial direction (X-direction), instead of being formed to be disposed along the inner circumference of the back yoke portion 75 in an arc-shape. This way, a gap S5 is provided between the inner circumference of the back yoke portion 75 and the inner circumference of the slot cell 573B.

Characteristics of the Compressor of the Present Embodiment

The compressor of the present embodiment has the following characteristics.

In the compressor of the present embodiment, the gap S5 is provided between the back yoke portion 75 and the slot cell 573B. This restrains the welding heat from being transferred to the slot cell 573B. As the result, melting of the slot cells 573B and 573A is restrained.

Further, in the compressor of the present embodiment, the slot cell 573B on the outer side is made of an aramid-based nonwoven fabric whose Young's modulus is greater than PET which is typically used as the material for a slot cell. This way the slot cell 573B on the outer side is hardly warped. Thus, the slot cell 573 having the slot cell 573B and the slot cell 573A on the inner side is not disposed along the back yoke portion 75 in the slot 77, and the gap 55 is formed between the back yoke portion 75 and the slot cell 573. Thus, by simply changing the material for the slot cell 573B on the outer side, the gap S5 for restraining heat transfer to the slot cell 573B is easily formed without changing the shape of the core 71.

Further, the compressor of the present embodiment uses the two slot cells 573A and 573B which are laminated to each other. This realizes an improved dielectric strength as compared with a case of using a single slot cell having a similar thickness.

Further, in the compressor of the present embodiment, the reliability is improved by the slot cell 573B made of an aramid-based nonwoven fabric which is excellent in the strength and the durability. Specifically, using an aramid-based nonwoven fabric as a material for the slot cell 573B on the outside which is more easily influenced by the welding heat improves the reliability of the compressor.

In a compressor using a slot cell 573B made of an aramid-based nonwoven fabric having a high elasticity, the slot cell 573B is firmly disposed by arranging a slot cell 573A on the inner side of the slot cell 573B to press the slot cell 573B, the slot cell 573A being made of a PET film which is flexible and easily disposed along the shape of the slot aramid-based nonwoven fabric. This restrains the slot cell 573B from being enwound at the time of winding.

Further, the cost of the PET film is lower than that of an aramid-based resin. Therefore, the PET film is more advantageous in terms of cost than laminating slot cells made of an aramid-based nonwoven fabric.

The above describes embodiments of the present invention, with reference to the drawings. The specific structures however shall not be limited to these embodiments. The scope of the present invention is indicated not only by the above embodiments, but also by the claims set forth hereinbelow. The scope of the present invention encompasses all the modifications and equivalents in the meaning within the scope of the claims.

For example, the above embodiments deal with a case of applying the present invention to a 2 cylinder compressor; however, the present invention is not limited to this. The present invention is applicable to a 1 cylinder compressor or a 3 cylinder compressor.

Further, the above embodiments deal with a case of a compressor using a $CO_2$ refrigerant; the present invention however is not limited to this. The present invention is also applicable to a compressor that adopts a refrigerant other than a $CO_2$ refrigerant.

The second embodiment deals with a case of adopting a slot cell using a PET film. The present invention however is not limited to this. The material of the slot cell is not limited to PET as long as a gap is provided between the back yoke portion and the slot cell.

Further, the above embodiments deal with a case where the winding method of the coil of a motor is a concentrated winding. The present invention however is not limited to this. The present invention is also applicable to a motor with a coil whose winding method is a distributed winding.

Further, the above embodiments deal with a case where the recess S11 extends in a direction (V-direction) perpendicularly crossing the radial direction (X-direction) in a plan view. The present invention however is not limited to this, as long as the recess S11 extends in a direction crossing the radial direction (X-direction).

Further, the third embodiment deals with a case of adopting two slot cells. The present invention however is not limited to this, and three or more slot cells may be adopted. In such a case, the slot cell closest to the coil is preferably made of PET, and the slot cell closest to the core is preferably made of an aramid-based resin.

Further, the third embodiment deals with a case where the core is the same as that used in the compressor of the first embodiment. The present invention however is not limited to this, and a plurality of slot cells may be disposed in a slot of a core having any of the recesses described in the second embodiment and the variations of the second embodiment.

The present invention realizes a compressor in which melting of an insulating member disposed in a slot is restrained.

The invention claimed is:
1. A compressor comprising:
a casing; and
a motor disposed inside the casing, the motor being welded to the casing at a plurality of weld positions, the motor including
a core having an annular back yoke portion, a plurality of tooth portions projecting radially inwardly from the back yoke portion, and a slot formed between the tooth portions adjacent to each other,
a coil disposed in the slot, and
at least one insulating member disposed in the slot to insulate the coil from the core,
recesses being formed in portions of the back yoke portion with each recess facing the slot, each of the recesses having a part opposing one of the weld positions, and
a gap provided between the back yoke portion and the insulating member.

2. The compressor according to claim 1, wherein a portion of the back yoke portion facing the slot is substantially arc-shaped.

3. The compressor according to claim 2, wherein the insulating member is made of an aramid-based resin.

4. The compressor according to claim 2, wherein, the at least one insulating member includes two or more insulating members laminated to each other, and one of the insulating members closest to the core is made of an aramid-based resin.

5. The compressor according to claim 2, wherein in a plan view, each of the recesses extends in a direction crossing the radial direction, and is formed in such a manner
that the recess is narrowed towards its both end portions relative to a direction crossing the radial direction, or
that the both end portions have a circular shape.

6. The compressor according to claim 2, wherein each slot has more than one of the recesses.

7. The compressor according to claim 1, wherein the insulating member is made of an aramid-based resin.

8. The compressor according to claim 7, wherein in a plan view, each of the recesses extends in a direction crossing the radial direction, and is formed in such a manner
that the recess is narrowed towards its both end portions relative to a direction crossing the radial direction, or
that the both end portions have a circular shape.

9. The compressor according to claim 7, wherein each slot has more than one of the recesses.

10. The compressor according to claim 1, wherein, the at least one insulating member includes two or more insulating members laminated to each other, and one of the insulating members closest to the core is made of an aramid-based resin.

11. The compressor according to claim 10, wherein at least one of the insulating members disposed on an inner side of the insulating member made of the aramid-based resin is made of a polyethylene terephthalate film.

12. The compressor according to claim 10, wherein in a plan view, each of the recesses extends in a direction crossing the radial direction, and is formed in such a manner
that the recess is narrowed towards its both end portions relative to a direction crossing the radial direction, or
that the both end portions have a circular shape.

13. The compressor according to claim 10, wherein each slot has more than one of the recesses.

14. The compressor according to claim 1, wherein in a plan view, each of the recesses extends in a direction crossing the radial direction, and is formed in such a manner
that the recess is narrowed towards its both end portions relative to a direction crossing the radial direction, or
that the both end portions have a circular shape.

15. The compressor according to claim 14, wherein each slot has more than one of the recesses.

16. The compressor according to claim 1, wherein each slot has more than one of the recesses.

17. The compressor according to claim 1, wherein the coil is a concentrated winding.

18. The compressor according to claim 1, wherein a $CO_2$ refrigerant is used in the compressor.

* * * * *